United States Patent

Yoshino

[11] Patent Number: 5,420,778
[45] Date of Patent: May 30, 1995

[54] INDEPENDENT REAL TIME CONTROL OF OUTPUT FREQUENCY AND VOLTAGE OF PWM INVERTER

[75] Inventor: Hozo Yoshino, Tokyo, Japan

[73] Assignee: System Homes Company, Ltd., Tokyo, Japan

[21] Appl. No.: 223,365

[22] Filed: Apr. 5, 1994

Related U.S. Application Data

[63] Continuation of Ser. No. 961,855, Oct. 16, 1992, abandoned, which is a continuation-in-part of Ser. No. 743,209, Aug. 9, 1991, abandoned.

[30] Foreign Application Priority Data

Aug. 9, 1990 [JP] Japan ................. 2-209144

[51] Int. Cl.$^6$ ................. H02M 5/451; H02P 5/40
[52] U.S. Cl. ................. 363/41; 363/97; 318/811; 318/812
[58] Field of Search ......... 363/37, 41, 97, 98; 318/811, 812

[56] References Cited

U.S. PATENT DOCUMENTS

| | | | |
|---|---|---|---|
| 4,451,112 | 5/1984 | Hattori et al. | 318/778 |
| 4,605,887 | 8/1986 | Boella et al. | 318/594 |
| 4,643,952 | 1/1987 | Yoshino et al. | 318/811 |
| 4,663,578 | 5/1987 | Iwasaki et al. | 318/762 |
| 4,786,847 | 11/1988 | Daggett et al. | 318/568 |
| 4,788,485 | 11/1988 | Kawagishi et al. | 318/811 |
| 4,823,251 | 4/1989 | Kawabata et al. | 363/95 |
| 5,010,223 | 4/1991 | Kim | 363/97 |
| 5,050,057 | 9/1991 | Notohara et al. | 363/37 |

Primary Examiner—Steven L. Stephan
Assistant Examiner—Adolf Berhane
Attorney, Agent, or Firm—Oblon, Spivak, McClelland, Maier & Neustadt

[57] ABSTRACT

An inverter for driving a motor, when a command frequency is given, the output voltage is increased as output current is increased as to optimize motor efficiency under varying load conditions. The inverter is comprised of a converter to convert an input ac voltage to a dc voltage, a current sensor to measure an output current for determining a load level of the motor, a voltage setting means to calculate a command voltage as a function of a command frequency and the measured current, an encoding means to issue on a real time basis bit patterns containing information on the command frequency and the command voltage, a decoding means to decode the bit patterns into a pulse width modulated (PWM) signal, a clock means to provide a timing signal for the encoding means and the decoding means, and an inverter to modulate the dc voltage by the PWM signal, thereby applying the motor input voltage to the motor.

4 Claims, 6 Drawing Sheets

INDEPENDENT REAL TIME CONTROL OF OUTPUT FREQUENCY AND VOLTAGE OF PWM INVERTER

This application is a Continuation of application Ser. No. 07/961,855, filed on Oct. 16, 1992, now abandoned, which is a Continuation-in-Part Application of U.S. application Ser. No. 07/743,209 filed Aug. 9, 1991, now abandoned.

BACKGROUND OF THE INVENTION

1. Field of the Invention

The present invention relates to an inverter, and more particularly to an inverter in which its output voltage level is adjusted on a real time basis in compliance with an output current level of the inverter, thereby continuously driving an induction motor at its efficiency optimal operating point.

2. Description of the Prior Art

Most of the prior art inverters employ a voltage/frequency (v/f) pattern as a predetermined set so that a command voltage is determined when a command frequency is selected. Namely, as indicated by FIG. 1, a command frequency and command voltage set is either a constant torque characteristic indicated by a straight line 01, reduced torque characteristic shown by a curved line 02, or a constant power v/f pattern illustrated by a straight line 03. A desired characteristic or a combination thereof can be selected manually among these characteristics.

When load characteristics are known for a prior art inverter, the most suitable characteristic can be selected for a given load. However, when an induction motor is employed as an actuator, desired motor speed and torque vary as functions of time. Even when an induction motor is utilized as a quasi-steady power generator, it is often the case that its load is either unknown or varying. Under these circumstances, the induction motor is being driven at an off-optimal operating point, the input electric energy cannot be converted efficiently to an output mechanical energy.

When an alternating current with a constant voltage is applied to a stator winding, this becomes an excitation current for an induction motor, generating a rotating magnetic field. An eddy current, i.e. load current is then induced on the motor rotor. An interaction between the rotating magnetic field and the magnetic field generated by the eddy current on the rotor will then generate torque to drive the load coupled to the rotor.

If the magnitude relationship between the voltage and current applied to the induction motor is unmatched, motor efficiency will be degraded. Namely, if the magnitude of the applied voltage is too large compared to the level of the load, iron loss (hysteresis loss of the magnetic circuit) and copper loss (resistance loss of the winding) will increase. These iron and copper losses will increase their magnitude almost proportionately to the circuit current squared. If, on the other hand, the magnitude of the applied voltage is too small compared to the level of the load, excitation current through the winding becomes insufficient to generate a necessary rotating magnetic field. To compensate for this insufficiency, the load current will increase drastically resulting in a secondary copper loss, which is almost proportinal to the load current squared.

SUMMARY OF THE INVENTION

FIG. 2 presents experimental results and shows energy optimal v/f patterns for an inverter to pull the maximum efficiency out of an induction motor under varying load conditions. As illustrated, the dotted line 04, dash and dotted line 05, and solid line 06, respectively, represent optimum output voltage versus command frequency characteristics for heavy, medium, and light load conditions. Apparent from the foregoing discussion, there exists an optimum combination of the inverter output voltage and output current to be applied to an induction motor for a given speed and load condition. Since the prior art inverter in general use could not control these two variables independently and simultaneously, there was room for efficiency improvement.

An object of the present invention is to eliminate the above mentioned shortcoming of the prior art inverter and to improve energy efficiency of an induction motor. In order to facilitate this scheme, the present embodiment employs continuous sensor measurement of the load level or an output current flowing into the induction motor. The motor energy efficiency is optimized by continuously adjusting the inverter command voltage based on the command frequency and measured output current.

DETAILED DESCRIPTION OF THE PREFERRED EMBODIMENT

Figure 3:
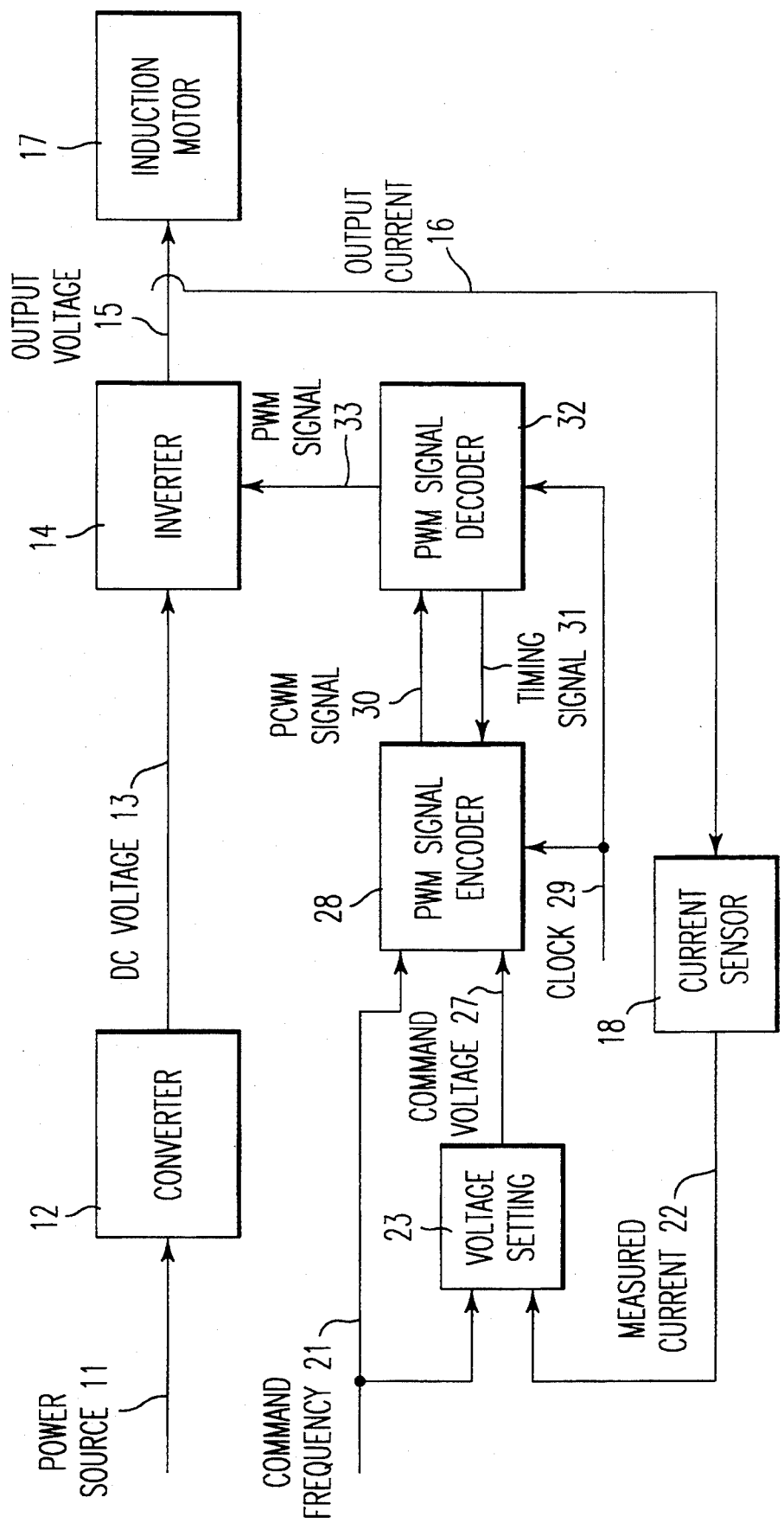
FIG. 3 is a block diagram showing an embodiment of an inverter according to the present invention.

An embodiment of the present invention is explained by referring to FIG. 3. An ac voltage from a power source 11 is an input to the inverter, which is then converted to adc voltage 13 by a converter 12. The dc voltage 13 is then inverted by an inverter 14 into an output voltage 15. The inverter 14 is driven by a PWM signal 33.

The output voltage 15 is then input to an induction motor 17, generating a driving torque on the load which is coupled to the induction motor 17. A command voltage 27 is determined by a voltage setting means 23 as a function of a command frequency 21 and a measured current 22 monitored by a current sensor 18 which measures an output current 16. The PWM signal 33 is output from a PWM signal decoder 32 by inputting and decoding a pulse code width modulated (PCWM) signal 30 from a PWM encoder 28 after application of a timing signal 31. The PCWM signal 30 is generated by the PWM signal encoder 28 on a real time basis as a function of the command frequency 21 and the command voltage 27. The PWM signal encoder 24 is provided by the PWM signal decoder with a timing signal 26 which is generated by a clock 23.

The clock 29 is also fed to the PWM signal encoder 28.

Figure 1:
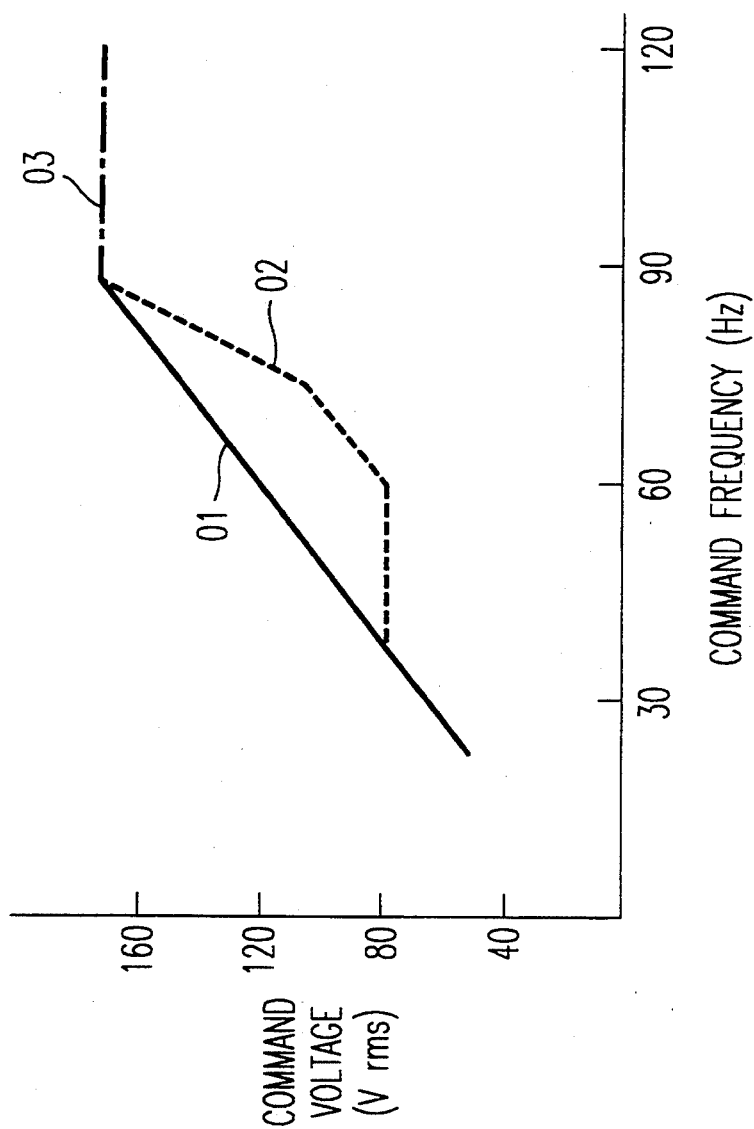
FIG. 1 is energy optimal v/f patterns for an inverter showing the relationship between the output voltage and the command frequency of the prior art inverter.
Figure 2:
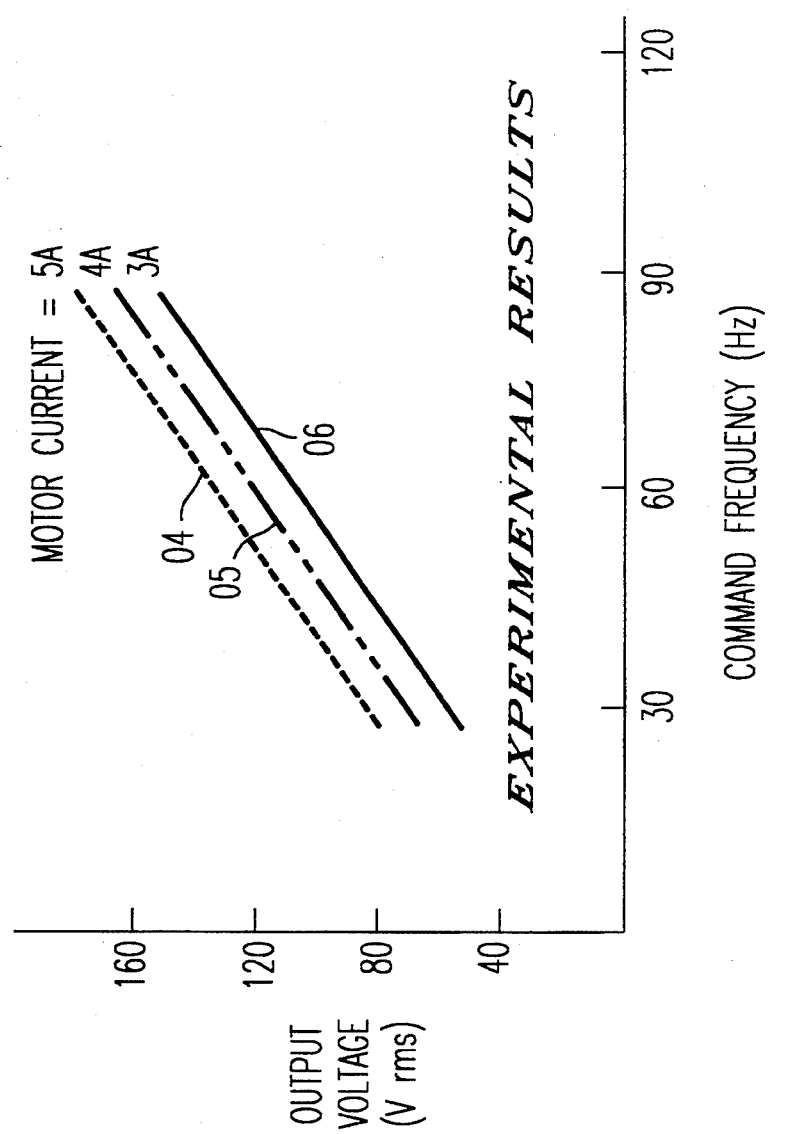
FIG. 2 is a diagram showing a relationship between the output voltage and the command frequency with the output current as a parameter to pull the maximum efficiency out of an induction motor under varying load conditions.

The present invention is now explained functionally in the following. Assume that a constant torque is applied by the load to the induction motor 17 for all command frequencies. For the prior art inverter under a constant torque, the relationship of the command voltage 27 versus command frequency 21 is then given by a straight line 01 in FIG. 1 as the performance optimal locus. This characteristic however does not cover a varying torque. According to the present invention, the command voltage 27 is increased as the measured current 22 is increased to obtain the characteristics shown in FIG. 2. The optimal command voltage is determined experimentally for a given motor speed and torque condition by conducting motor performance testing. The command voltage 27 is either calculated as a function of the command frequency 21 and the measured current 22 or given in a form of a table as a function of these variables. This operation is performed by software in the voltage setting means 23.

Figure 4:
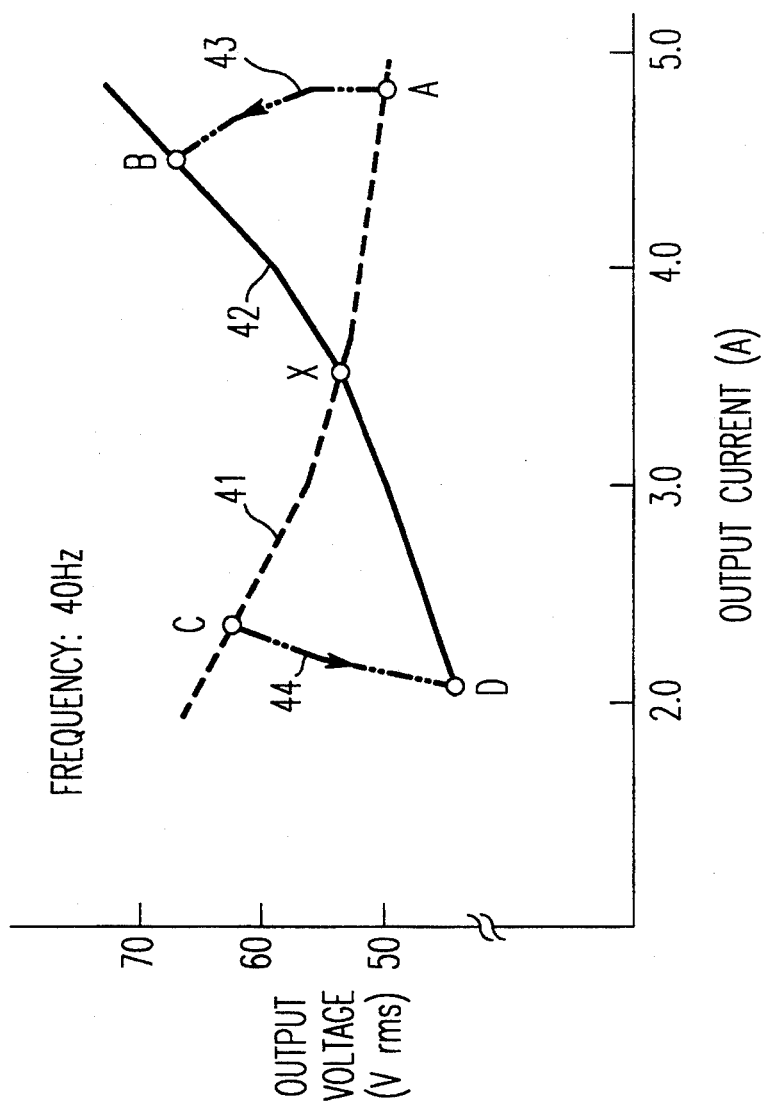
FIG. 4 is a diagram comparing the prior art inverter with the present invention illustrating the relationship between the output ac voltage and the output ac current at a constant command frequency.

FIG. 4 shows the relationship between the output ac voltage 15 and the output ac current 16 of the inverter 14 for the command frequency of 40 Hz as an example. The dotted line 41 is a characteristic of the prior art inverter where the setting of the command voltage 27 is fixed independent of the magnitude of the applied load. In this case, the level of the output voltage 15 is lowered as the magnitude of the load or the output current 16 is increased due to the increased internal resistance loss of the converter 12 and the inverter 14. On the other hand, the level of the output voltage 15 is raised as the magnitude of the load or the output current 16 is decreased. In the case where a nominal output current 16 is smaller than the value corresponding to "X" in FIG. 4, the output voltage 15 is too high for the torque applied by the load. The excess amount of excitation current will create additional iron and copper losses. This characteristic becomes more significant as the torque applied by the load gets smaller. In the case where a nominal output current 16 is larger than the value corresponding to "X" in FIG. 4, the output voltage 15 is too low for the torque applied by the load. An insufficient amount of excitation current in this case will cause the load current to increase such that the secondary copper loss will increase drastically. This characteristic becomes more significant as the torque applied by the load gets larger. It is therefore desirable that the relationship between the output current 16 and the output voltage 15 should have a linear relationship as shown by the line 42 in FIG. 4 in order for the induction motor 17 to maintain its maximum operating efficiency continuously whatever the applied torque of the load might be. For the prior art inverter, the output voltage 15 from the inverter 14 decreases along the dotted line 41 as the output current 16 increases its magnitude and reaches, for instance, an operating point "A" as indicated. By utilizing the capability of the present invention, the command voltage 27 can be increased along the locus of the dash and dotted line 43 to an optimal operating point "B". The output current 16 for this point will be reduced compared to that at "A", and so is the power input to the converter 12. Similarly, the output voltage 15 from the inverter 14 increases along the dotted line 41 as the output current 16 decreases its magnitude and reaches, for instance, an operating point "C" as indicated. By utilizing the capability of the present invention, the command voltage 27 can be decreased along the locus of the dash and dotted line 44 to an optimum operating point "D". The output current 16 for this point will be reduced compared to that at "C", and so is the power input to the converter 12. In this way, the output voltage 15 from the inverter 14 changes its magnitude in accordance with the output current 16 since both have a linear relationship with each other. The phase angle between the output voltage 15 and output current 16 stays substantially optimal in this fashon, and the power factor on the load side will be optimized and the induction motor efficiency improves.

The embodiment of FIG. 3 will bring the output voltage 15 close to the desired value. However, for the case when the converter input voltage is varied, the output voltage 15 cannot be controlled precisely. To cope with this situation, an alternate embodiment is presented in FIG. 5 in which the same numerals with FIG. 3 designate the same components. A target voltage 24 is given by a table shown in FIG. 2. The target voltage 24 is the ideal output voltage 15 for the corresponding output current 16. A voltage sensor 19 measures the output voltage 15 and outputs a measured voltage 25. A subtractor 35 calculates a voltage difference 36 by subtracting the measured voltage 25 from the target voltage 24. An integrator 26 with its gain A and an initial condition input 37 will bring the measured voltage 25 equal to the target voltage 24 by integrating the voltage difference 36. The voltage setting means 23, the subtractor 35, and the integrator 26 are mechanized by software in a microcomputer.

Figure 6:
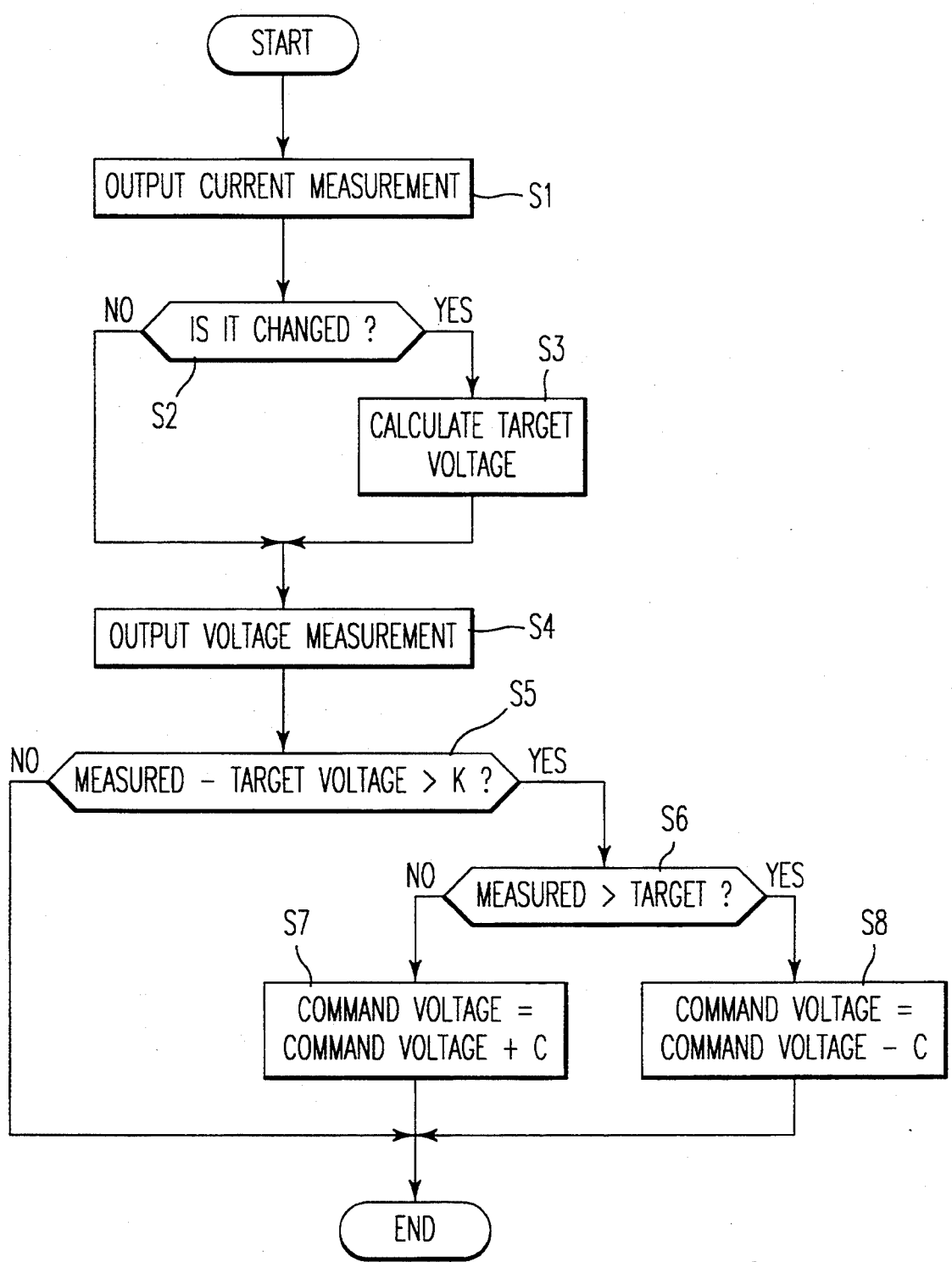
FIG. 6 is a flow chart for a subprogram to obtain a command voltage of FIG. 5.

The subprogram to calculate the command voltage 27 will be explained in the following for the system at a constant command frequency in steady state, referring to the flow chart in FIG. 6. As shown in FIG. 6, step S1 measures the output ac current 16 and the result is analog-to-digital converted to obtain the measured current 22. Step S2 judges whether the measured current 22 is equal to the value measured and stored previously. If the judgement is negative, step S4 follows. If positive, step S3 is entered. In step S3, the target voltage 24 is calculated by the voltage setting means 23 as a function of the command frequency 21 and the newly updated measured current 22. Step S4 measures the output voltage 15 and the result is analog-to-digital converted to obtain the measured voltage 25.

The magnitude of the measured voltage 25 is compared to the target voltage 24 in step S5, and the subprogram is terminated when the difference is below a predetermined constant value K. If the difference is equal to or greater than the constant value K, the magnitude of the measured voltage 25 is compared with the target voltage 24 in step S6. If the measured voltage 25 is less than the target voltage 24, then step S7 is entered and the command voltage 27 is incremented by a constant C and the subprogram is ended. If the measured voltage 25 is greater than the target voltage 24, then step S8 is entered and the command voltage 27 is decremented by the constant C and the subprogram is terminated.

Figure 5:
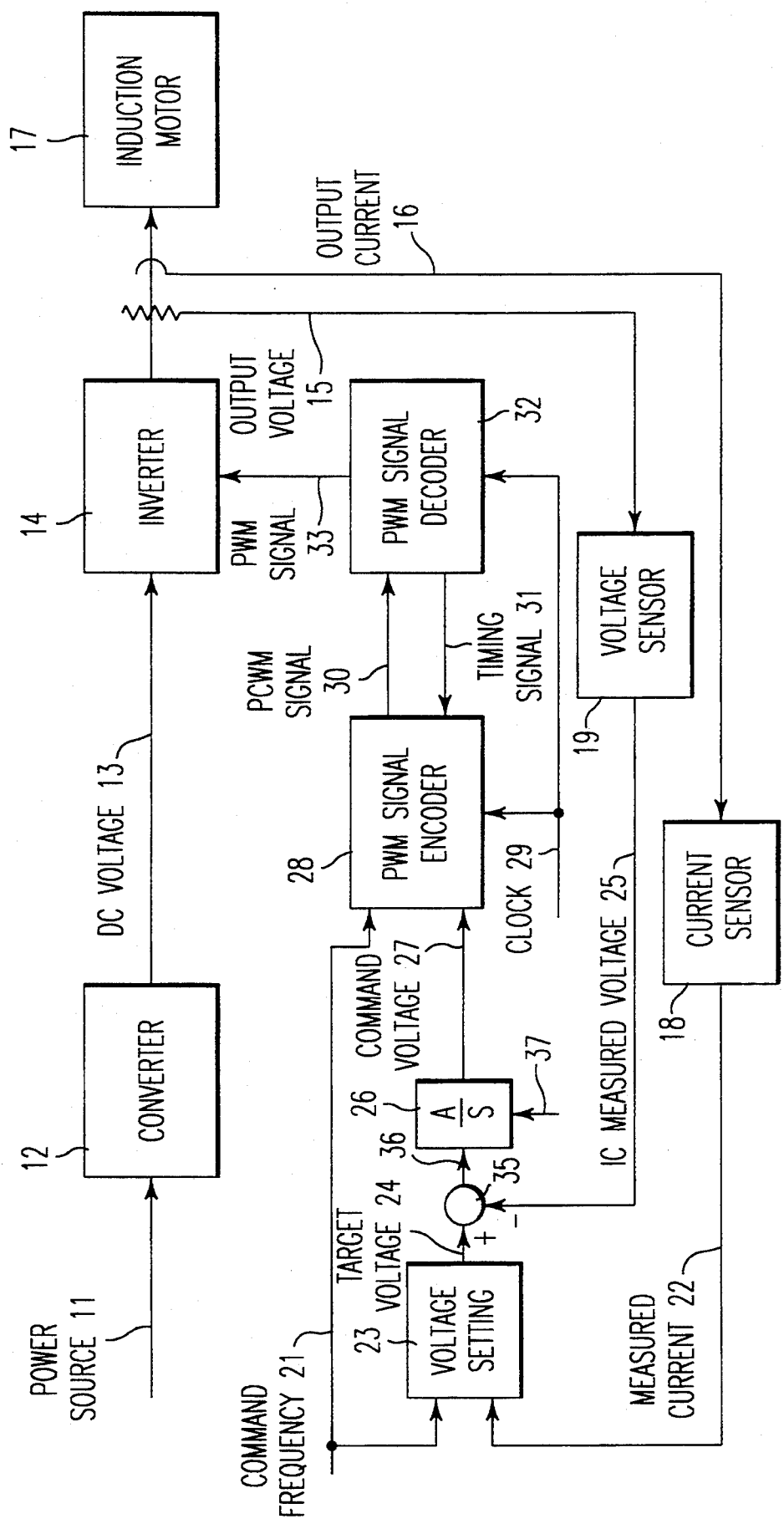
FIG. 5 is a block diagram showing an alternate embodiment of an inverter according to the present invention.

It is noted in the block diagram in FIG. 5 that the means corresponding to step S5 is omitted for brevity.

The relationship between the output ac voltage 15 and the output current 16 as shown by the solid line 42 in FIG. 4 can be realized by the above mentioned embodiment and method, namely, by software in the microcomputer together with the PWM signal decoder 32, possibly made of LSI, which can control the frequency and voltage of an inverter independently. Without spending an extra cost on the equipment hardware, an induction motor can always be driven at its optimum efficiency.

Because a degree of overload can be reduced by voltage control, design margin for the equipment is reduced and the size of the equipment becomes smaller.

The present embodiment of an inverter can be thought of as a power source with a negative internal impedance, as characterized by the solid line 42 in FIG. 4.

What is claimed is:

1. An inverter whose output frequency and output voltage can be controlled independently to have a motor operate at an efficiency optimum operating point by controlling said output voltage to follow a predetermined value for a given command frequency and output current, comprising:
   (1) a converter to convert an input ac voltage of a power source to a dc voltage;
   (2) a current sensor to measure said output current for determining a load level on said motor;
   (3) a voltage setting means to calculate a command voltage as a function of said command frequency and a measured current by said current sensor of which optimal relations are predetermined by conducting motor performance testing;
   (4) an encoding means to issue on a real time basis, triggered by a timing signal, a pulse code width modulated (PCWM) signal containing information on said command frequency and said command voltage;
   (5) a decoding means to input and decode said PCWM signal into a pulse width modulated (PWM) signal by applying said timing signal to said encoding means;
   (6) a clock means to provide a timing signal for said encoding means and said decoding means; and
   (7) an inverter to modulate said dc voltage by said decoded PWM signal thereby applying said output voltage to said motor.

2. An inverter as claimed in claim 1, wherein said voltage setting means comprises software embedded in a microcomputer in which said command voltage is programmed to increase as said measured current, monitored by said current sensor, is increased in order to optimize said motor efficiency.

3. An inverter whose output frequency and output voltage can be controlled independently to have a motor operate at an efficiency optimum operating point by controlling said output voltage to follow a predetermined value for a given command frequency and output current, comprising:
   (1) a converter to convert an input ac voltage of a power source to a dc voltage;
   (2) a current sensor to measure said output current for determining a load level on said motor;
   (3) a voltage sensor to measure said output voltage;
   (4) a voltage setting means to calculate a target voltage as a function of said command frequency and a measured current by said current sensor of which optimal relations are predetermined by conducting motor performance testing;
   (5) a subtractor means to obtain a voltage difference by subtracting a measured voltage by said voltage sensor from said target voltage;
   (6) an integrator means to generate a command voltage to bring said measured voltage equal to said target voltage by integrating said voltage difference;
   (7) an encoding means to issue on a real time basis triggered by a timing signal, a pulse code width modulated (PCWM) signal containing information on said command frequency and said command voltage;
   (8) a decoding means to input and decode said PCWM signal into a pulse width modulated (PWM) signal by applying said timing signal to said encoding means;
   (9) a clock means to provide a timing signal for said encoding means and said decoding means; and
   (10) an inverter to modulate said dc voltage by said decoded PWM signal thereby applying said output voltage to said motor.

4. An inverter as claimed in claim 3, wherein said voltage setting means, said subtractor means and said integrator means comprise software embedded in a microcomputer in which said target voltage is programmed to increase as said measured current, monitored by said current sensor, is increased in order to optimize said motor efficiency.

* * * * *